United States Patent [19]

Seeley et al.

[11] Patent Number: 5,284,061
[45] Date of Patent: Feb. 8, 1994

[54] INTEGRAL PRESSURE SENSOR

[76] Inventors: Eric E. Seeley, 538 Rio Bravo St., Ridgecrest, Calif. 93555; Allan D. Jackson, P.O. Box 246, Weldon, Calif. 93283

[21] Appl. No.: 948,502

[22] Filed: Sep. 21, 1992

[51] Int. Cl.[5] .............................. G01L 7/16; G01L 9/00
[52] U.S. Cl. ........................................ 73/746; 73/753; 73/DIG. 3; 338/32 H
[58] Field of Search ............... 73/40, 49.2, 49.3, 52, 73/745, 746, 753, 146.5, 146.8, DIG. 3; 340/451, 611, 614, 626; 200/81 R, 81.9 M, 82 E; 338/32 H, 36, 42, 47

[56] References Cited

U.S. PATENT DOCUMENTS

| | | | |
|---|---|---|---|
| 4,181,835 | 1/1980 | Stadler et al. | 340/611 X |
| 4,507,976 | 4/1985 | Banko | 73/DIG. 3 X |
| 4,638,132 | 1/1987 | Miller | 73/745 X |

Primary Examiner—Richard E. Chilcot, Jr.
Assistant Examiner—Joseph L. Felber
Attorney, Agent, or Firm—Robert J. Hampsch; Melvin J. Sliwka; John L. Forrest, Jr.

[57] ABSTRACT

An integral pressure sensor for a pressurized vessel, including a housing, a core element, a seal and a spring. This combination is disposed on the interior of the pressurized vessel. The core element is preferably a magnetic element or a steel ball which moves in the housing under the effect of the vessel pressure, and the chamber or housing pressure. The spring and seal combination together with the core element, function to trap a specified volume of the pressurized medium in the chamber when the vessel is initially pressurized. When the pressurized vessel leaks, the trapped pressure within the chamber exceeds the vessel pressure thereby causing the core element to move. The position or presence of the core element is detected using a detecting device such as a Hall-effect device or another magnetic device.

15 Claims, 2 Drawing Sheets

INTEGRAL PRESSURE SENSOR

BACKGROUND OF THE INVENTION

The present invention relates to pressure measurement techniques and specifically to pressure sensing devices such as pressure leak detectors. The present invention solves the problem of detecting pressure changes in a pressurized vessel without introducing additional leakage paths. There is a need for a highly reliable, relatively low cost pressure measurement technique that does not introduce additional leakage paths into a system. Pressure sensors often require some external energy source in order to monitor the sensor output. The present invention does not require an external or additional energy source in that the integral pressure sensor traps the medium when the vessel is pressurized and utilizes the trapped energy to activate the sensor.

The present invention also addresses the problem of verification of pneumatic system source pressure in containers used for various weapon systems. This present invention can also be applied to long and short term storage of hazardous waste, gaseous compounds, or chemicals where an inexpensive and reliable method for indicating the internal pressure change of a containment vessel is required. This new method of indicating the pressure status has numerous applications including use in automotive systems, actuation systems, fire extinguishers, pressure bladders, inflatable devices and many other areas involving pressurized vessels or storage tanks.

The related art can be separated into two general categories. The first category is pressure measurement techniques which broach the integrity of the pressurized vessel or system. The second category include those pressure measuring techniques which do not broach or otherwise introduce additional leakage paths to the pressurized vessel or system. The first category involves the most common methods of measuring the pressure of a sealed container. The use of pressure gauges and pressure transducers typically involves creating additional apertures or holes in the container. Alternatively, pressure gauges are often attached to existing orifices. In either situation these pressure sensing devices introduce at least one additional point from where the vessel or container can leak. The introduction of additional leakage points is a problem which the present invention solves.

Related techniques in the second category or for non-intrusive pressure indication techniques can involve the removal, isolation and subsequent weighing of the pressurized vessel. Frequently, this approach is not feasible given the size of the vessel, accessibility and other logistical constraints. Alternative techniques include measurement of vessel strain which often require sophisticated electronics to account for variables such as temperature. All of the related pressure measurement devices or techniques are not acceptable due to timeliness concerns, high complexity, low reliability, high cost, and other logistical considerations.

SUMMARY OF THE INVENTION

The present invention is an integral pressure sensor for a pressurized vessel. The essential elements of the integral pressure sensor include a housing which contains an interior chamber and an opening. This housing is disposed in the interior of the pressurized vessel. A core element, preferably a magnetic element, is movably situated in the housing. The core element moves in the housing under the effect of the differential pressure between the vessel pressure, and the chamber pressure. Also inside the housing of the integral pressure sensor is a sealing device or seal which is located proximate the opening. In addition, a spring or other elastic force member is preferably disposed within the chamber and biased such that the core element comes in contact with said sealing device to seal the chamber from the pressurized vessel.

The spring and seal combination together with the core element, function to trap a specified volume of the pressurized medium in the chamber. As the pressurized vessel leaks, the trapped pressure exceeds the vessel pressure thereby causing the core element to move. The position or presence of the core element is preferably detected using a detecting device. The detecting device is situated proximate the exterior of the pressurized vessel. In the preferred embodiment, an omnipolar Hall-Effect device is used with the preferred magnetic core element.

Accordingly, it is an object of this invention to provide a pressure sensor that does not introduce additional leakage paths into a system.

It is another object of the invention to provide a pressure sensor that traps a small volume of a pressurized medium of a pressurized vessel. This trapped volume of pressurized medium is the source of energy required to activate the sensor.

It is yet another object of this invention to provide a highly reliable and low cost discrete pressure measurement system. That is to say, the pressure measurement system detects a change in pressure above or below a given threshold pressure.

An advantage of the invention is that the operation of the integral pressure sensor is typically not affected by the temperature of the pressurized vessel.

Another advantage of the invention is that the integral pressure sensor does not require the use of electronic instrumentation or external power sources. Pressure sensors that do not require electronics or additional power sources are typically better suited for field applications including remote sites.

A feature of the present invention is the structural simplicity and flexibility of the integral pressure sensor. The integral pressure sensor can be configured such that the sensor can easily be reset and used again or configured so that it operates as a 'one shot' or non resetable sensor.

DETAILED DESCRIPTION

Figure 1:
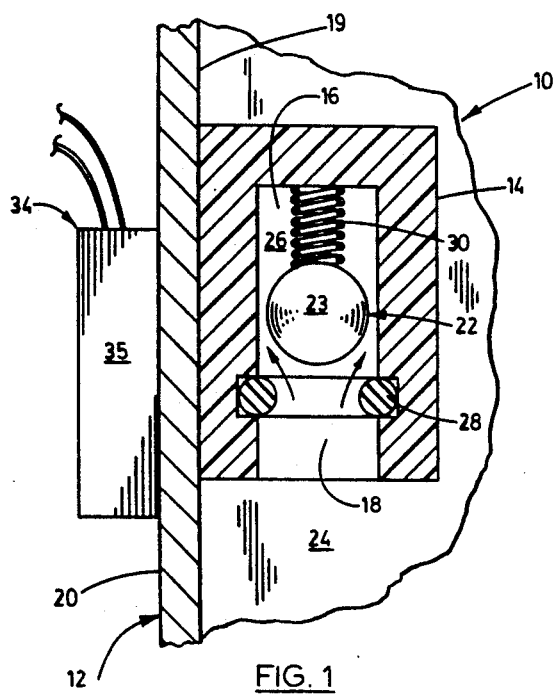
FIG. 1 depicts an embodiment of the present invention as the vessel is being pressurized.

As discussed above the integral pressure sensor (10) can be used to indicate discrete pressure fluctuations in pressurized vessels as well as detect leaks in such vessels or containers. The integral pressure sensor (10) has applications in all types of pressurized vessels include vacuums. An embodiment of the integral pressure sensor (10) is shown in FIGS. 1-4. The integral pressure sensor (10) comprises a housing (14) which defines an interior chamber (16) and an opening (18). This housing (14) is preferably attached to the interior surface (19) of a pressurized vessel (12). Alternative configurations permit the housing (14) to merely be disposed in the interior of the pressurized vessel (12) without attachment to the interior surface. The integral pressure sensor (10) also includes a core element (22) which is initially situated within the interior chamber (16) of the housing (14). The core element (22) is preferably a magnetic ball (23) which is capable of moving in the housing (14) under the effect of the vessel pressure (24), and the chamber pressure (26).

Figure 2:
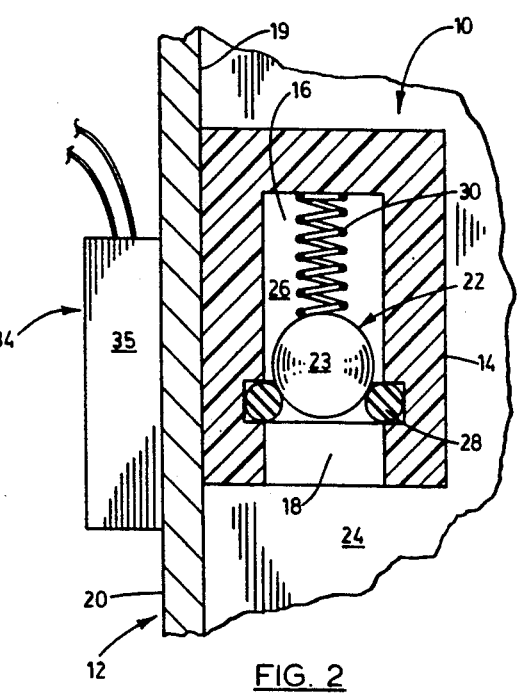
FIG. 2 depicts an embodiment of the present invention as the vessel reaches a state of equilibrium. The pressure in the chamber is approximately equal to the pressure in the vessel. The core element, spring and O-ring seal the pressurized chamber from the pressurized vessel.

A preferred embodiment of the integral pressure sensor (10) also includes an O-ring (28) which is located near the opening (18) of the housing (14). In addition, a spring (30) is disposed within the interior chamber (16). As shown in FIG. 1 and FIG. 2, the spring (30) is biased such that the magnetic ball (23) rests in contact with the O-ring (28). This combination forms an effective seal between the interior chamber (16) and the pressurized vessel (12) when a pressure differential is present between the interior chamber (16) and the pressurized vessel (12). The integral pressure sensor (10) may further include a detector (34) which senses the presence of the core element (22) or the position of the core element (22) or both. A preferred detector (34) is an omnipolar Hall Effect device (35) which would detect the presence of a magnetic field proximate the housing (14). As shown in FIGS. 1-4, the detector (34) is located on or near the exterior surface (20) of the pressurized vessel (12).

To increase the sensitivity of the Hall Effect device (35), the integral pressure sensor (10) may also include a flux concentrator (not shown). The use of a flux concentrator will allow for greater separations between the magnetic core element (22) and the detector (34) as well as reducing the required amount of magnetic material in the core element (22).

The operation of the integral pressure sensor (10) shown in FIGS. 1-4 is described in the following paragraphs. The initial volume of air or other medium in the interior chamber (16) of the housing (14) exists at some pressure level which is referred to as chamber pressure (26) in FIG. 1. When the vessel (12) is filled with a volume of a pressurized medium, the pressure of the medium inside the vessel, excluding the interior chamber (16) of the housing (14), is referred to as the vessel pressure (24). As the vessel (12) is pressurized, the interior chamber pressure (26) is slightly lower than the vessel pressure (24). The existing differential pressure causes the magnetic ball (23) to lift off the O-ring (28), compressing the spring (30) and equalizing the vessel pressure (24) and the interior chamber pressure (26). The detector (34), such as Hall Effect device (35) indicates the presence of a magnetic field.

As seen in FIG. 2, as soon as the interior chamber pressure (26) is equal to the vessel pressure (24), the spring (30) biases the magnetic ball (23) against the O-ring (28) thereby trapping a specified volume of the pressurized medium in the interior chamber (16) at a new interior chamber pressure (26). The combination of the spring (30), the magnetic ball (23), and the O-ring (28) act to isolate the volume of pressurized medium in the interior chamber (16) at the interior chamber pressure (26) from the volume of pressurized medium in the vessel at the vessel pressure (24). The detector (34) continues to indicate the presence of a magnetic field.

Figure 3:
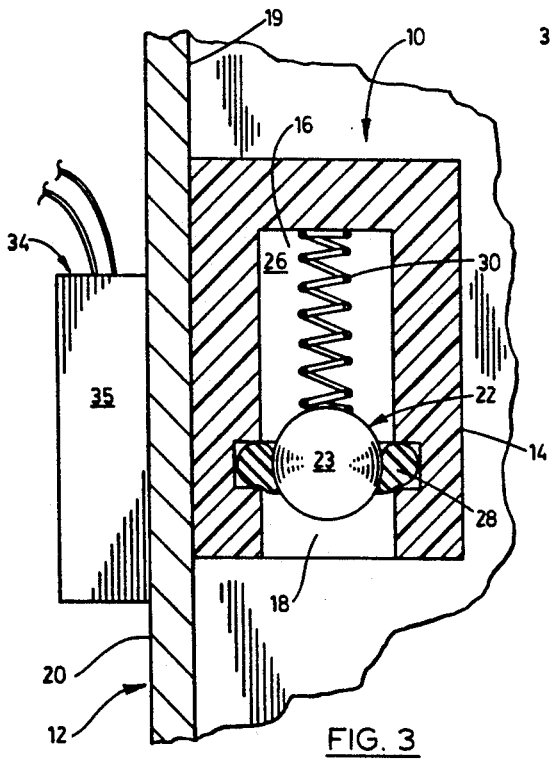
FIG. 3 depicts an embodiment of the present invention wherein the vessel pressure is reduced due to leakage or normal de-pressurization. The core element, spring and O-ring maintain the seal between the pressurized chamber and the pressurized vessel.

FIG. 3 shows a condition where the vessel pressure (24) is decreasing due to some anomaly such as a slow leak. In this condition, the interior chamber pressure (26) remains essentially constant. However, the vessel pressure (24) has decreased. The differential pressure between the interior chamber pressure (26) and the vessel pressure (24) is such that the magnetic ball (23) is seated against the O-ring (28). Although the position of the magnetic ball (23) has changed slightly, the detector (34) will still indicate the presence of a magnetic field.

Figure 4:
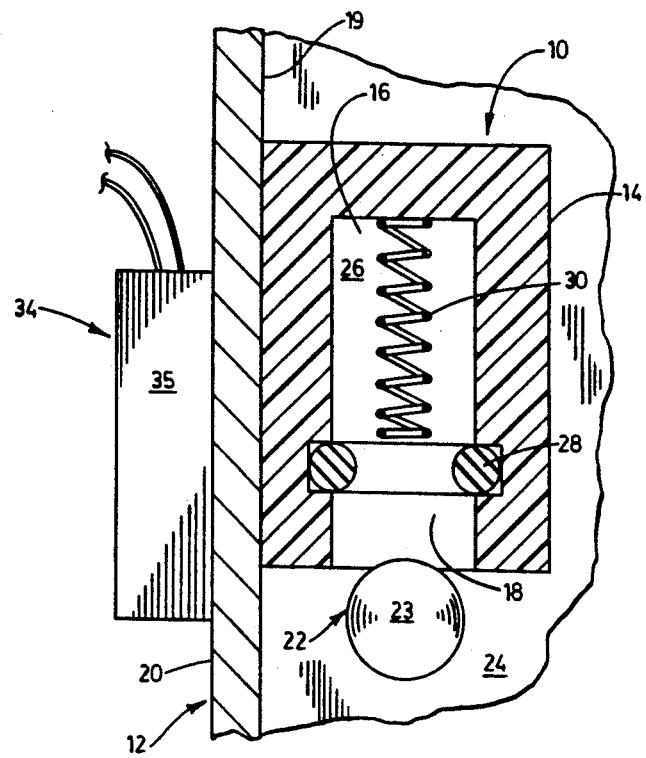
FIG. 4 depicts an embodiment of the present invention as the core element is ejected from the chamber resulting from a decrease in vessel pressure below a threshold value which causes a differential pressure to develop.

FIG. 4 shows a condition where the pressurized vessel (12) has leaked thereby causing a differential pressure between the vessel pressure (24) and the interior chamber pressure (26). This pressure differential is in excess of a predetermined threshold. That is to say, the vessel pressure (24) is below a predetermined value. The difference between the interior chamber pressure (26) and the vessel pressure (24) was such that the O-ring (28) fails and the magnetic ball (23) is ejected from the interior chamber (16). The detector (34) indicates the absence of a magnetic field.

Figure 5:
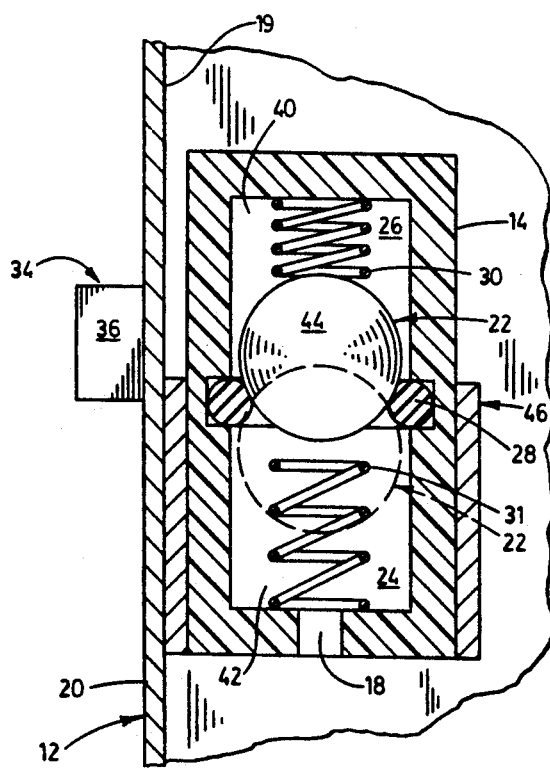
FIG. 5 shows an alternate configuration of the present invention wherein the core element is toggled between two positions as the pressure in the vessel and the pressure in the chambers dictate.

Having discussed a preferred embodiment in some detail, the paragraphs that follow will describe an alternate embodiment of the integral pressure sensor (10) which is shown in FIG. 5.

The integral pressure sensor (10) illustrated in FIG. 5 is a reusable or resetable sensor. This embodiment comprises a housing (14) which defines an upper chamber (40), a lower chamber (42), and an opening (18). This housing (14) is disposed in the interior of a pressurized vessel (12). The integral pressure sensor (10) of FIG. 5 also includes a core element (22) which is initially situated within the interior chambers of the housing (14). The core element (22) in this embodiment is preferably a steel ball (44) which is capable of moving between the two chambers (40,42) in the housing (14) under the effect of the vessel pressure (24) or lower chamber pressure (24), and the upper chamber pressure (26).

This preferred embodiment of the integral pressure sensor (10) also includes an O-ring (28) which is located between the upper chamber (40) and the lower chamber (42). In addition, two springs (30,31) are disposed within the chambers (40,42). The first spring (30) is located in the upper chamber (40) and is biased towards the lower chamber (42) such that when the core element (22) resides in the upper chamber (40), the core element (22) can be forced in contact with the O-ring (28) to isolate the upper chamber (40) from the lower chamber (42). The second spring (31) is disposed in the lower chamber (42) and is biased towards the upper chamber (40) such that when the core element (22) resides in the lower chamber (42), the core element (22)

may rest in contact with the O-ring (28) to again isolate the upper chamber (40) and the lower chamber (42).

The integral pressure sensor (10) may further include a detector (34) which senses the presence of the core element (22) or the position of the core element (22) or both. The preferred detector (34) in this embodiment is a mechanical detector (36) such as a magnetic device which would detect the presence of a steel ball (44) in the upper chamber (40). The lower chamber (42) is shrouded with a magnetic shield (46) which prevents the detector (34) from sensing the steel ball (44) in the lower chamber (42). Alternatively, the lower chamber (42) may be internally lined with a similar shield. As shown in FIG. 5, the detector (34) can be located on or near the exterior surface (20) of the pressurized vessel (12).

The operation of the integral pressure sensor (10) shown in FIG. 5 is much the same as described earlier. The volume of air or other medium in the upper chamber (40) of the housing (14) initially exists at some pressure level which is referred to as the upper chamber pressure (26) in FIG. 5. When the pressurized vessel (12) is filled with a volume of a pressurized medium, the pressure of the volume of the medium inside the vessel, including the lower chamber (42) is referred to as the vessel pressure (24) or lower chamber pressure (24). As the vessel is pressurized, the upper chamber pressure (26) is slightly lower than the lower chamber pressure (24). The differential pressure lifts the steel ball (44) off the O-ring (28) and compresses the first spring (30) thus equalizing the upper chamber pressure (26) and lower chamber pressure (24). The detector (36), such as a magnetic device indicates the presence of the steel ball (44).

When the upper chamber pressure (26) and the lower chamber pressure (24) are equal, the first spring (30) biases the steel ball (44) against the O-ring (28) thereby trapping a specified volume of the pressurized medium in the upper chamber (40). The combination of the first spring (30), the steel ball (44), and the O-ring (28) act to isolate the volume of pressurized medium in the upper chamber (40) at the upper chamber pressure (26) from the volume of pressurized medium in the lower chamber (42) at the vessel pressure (24) or lower chamber pressure (24). The detector (36) continues to indicate the presence of the steel ball (44).

If the vessel pressure (24) decreases due to leakage, the upper chamber pressure (26) remains essentially constant. However, the vessel pressure (24) or lower chamber pressure (24) has decreased. The pressure differential between the upper chamber pressure (26) and the lower chamber pressure (24) causes the steel ball (44) to seat against the O-ring (28). In addition, the first spring (30) continues to hold the steel ball (44) towards the O-ring (28). Although the position of the steel ball (44) has changed slightly, the detector (36) will still indicate the presence of the steel ball (44).

When the differential pressure exceeds the design limit, the O-ring (28) yields allowing the steel ball (44) to be transferred from the upper chamber (40) to the lower chamber (42). The detector (36) then indicates the absence of the steel ball (44) due to the presence of the magnetic shield (46) proximate the lower chamber (42).

The reusable sensor also works in the reverse mode and can detect pressure increases when the steel ball (44) resides in the lower chamber (42). In this mode, the integral pressure sensor (10) provides an over pressure indication. That is to say the integral pressure sensor (10) may yield a discrete pressure indication as the vessel is recharged or the vessel pressure (24) is otherwise increased beyond a designed threshold value.

If the vessel pressure (24) increases, the second spring (31), steel ball (44), and O-ring (28) form a seal isolating the upper chamber (40) from the lower chamber (42). It is important to note that the second spring (31) continues to bias the magnetic ball (23) towards the O-ring (28). When the pressure differential between the upper chamber pressure (26) and the lower chamber pressure (24) exceeds the design limit, the O-ring (28) yields and the steel ball (44) is transferred from the lower chamber (42) to the upper chamber (40). The detector (36) then indicates the presence of the steel ball (44).

The core element (22) and detector (34) must be compatible with one another. A magnetic core element (22) can be used with a Hall Effect device (35) as the detector (34). Alternatively, a ferrous based core element (22) can be used with a magnetic detector (36). The core element (22) may be radioactive provided that the detector (34) is capable of sensing radiation. Numerous other sensing techniques such as radio frequency detectors, acoustic detectors, metal detectors, or inductive detectors can also be employed. Furthermore, the detector (34) can be an electronic type sensor or a mechanical sensor which does not require the use of an electronic output. The integral pressure sensor (10) operates independently of the detection method. The detector may be attached to the vessel or merely located proximate the vessel. A detector can be considered proximate the vessel if the detector can successfully detect the presence of the core element.

The O-ring (28) used in the described embodiments are representative of any sealing device or apparatus which will function in cooperation with the core element (22) to form a proper seal. Likewise the springs (30,31) employed in the described embodiments are representative of any force applying means which will function to orient the core element (22) towards the sealing device. Examples of such elastic force members include a pusher, compression block, or a bellows device. In addition, alternative force applying means such as pneumatic pressure differences, gravity, or a centrifugal devices will work as well.

The mechanical properties of the springs (30,31), such as the spring constant, are directly related to the sensitivity of the integral pressure sensor (10). The differential pressures required to activate the integral pressure sensor (10) as well as the differential pressures required to trap or store the activation energy of the integral pressure sensor (10) is dependent on the physical properties of the springs used. The threshold pressures are therefore considered variable in accordance with the springs employed in the integral pressure sensor (10). Other physical characteristics of the integral pressure sensor (10) such as the chamber volume, the O-ring diameter, and the core element diameter or geometry affect the sensitivity and operation of the integral pressure sensor (10). Likewise, the tolerances and materials used in the fabrication of the integral pressure sensor (10) and any lubrication of the sensor contribute to the overall operational sensitivity of the integral pressure sensor (10).

The housing (14) is constructed from a material that will not interfere with the operation of the detector (34). In the preferred embodiment, the housing (14) is a light weight, non-ferrous, non-porous, high strength cylindrical housing (14) with an open aft end.

The vessel must also be constructed from a material that will not interfere with the operation of the detector (34). If the detector (34) employs a magnetic sensing technology, the vessel or container must be a non-ferrous material. The preferred embodiment utilizes a advanced composite vessel.

While specific embodiments of the integral pressure sensor (10) have been shown and described, many variations are possible. Additional features such as external electronic devices or additional processors may be employed. The particular construction and configuration of the housing (14) and core element (22), the type of detectors (34) used, and the interior configuration of the seal and spring (30) all may be changed to suit the system or application with which the sensor is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

What is claimed as the invention is:

1. An integral pressure sensor for a pressurized vessel comprising:
    a housing defining an interior chamber and an opening, said housing disposed in the interior of said vessel;
    a core element movably disposed in said interior chamber, said core element moving in said interior chamber under the effect of a differential pressure between said vessel pressure and said interior chamber pressure; and
    a means to trap said vessel pressure in said interior chamber, said means to trap being sealably disposed in said interior chamber and in operative association with said core element so that said interior chamber pressure is isolated from said vessel pressure.

2. An integral pressure sensor as set forth in claim 1 further comprising a means for detecting the position of said core element, said means for detecting being externally disposed on said pressurized vessel proximate said housing.

3. An integral pressure sensor as set forth in claim 1 wherein the means to trap said vessel pressure in said interior chamber further comprises:
    a sealing device disposed in said housing and proximate said opening; and
    an elastic force member attached within said housing and further in contact with said core element, said elastic force member biased such that the core element comes in contact with said sealing device to sealably isolate the chamber pressure from said vessel pressure.

4. An integral pressure sensor as set forth in claim 1 wherein said core element is a magnetic element.

5. An integral pressure sensor as set forth in claim 1 wherein said core element is a magnetic ball.

6. An integral pressure sensor as set forth in claim 1 wherein said core element is a steel ball.

7. An integral pressure sensor as set forth in claim 1 wherein said opening of said housing further defines an open end.

8. An integral pressure sensor as set forth in claim 1 wherein said sealing device is an O-ring seal.

9. An integral pressure sensor as set forth in claim 3 wherein said elastic force member is a spring.

10. An integral pressure sensor as set forth in claim 2 wherein said means for detecting the movement of said core element is a Hall-Effect device.

11. An integral pressure sensor for a pressurized vessel comprising:
    a housing defining an upper chamber, a lower chamber and an opening, said housing attached proximate to an interior surface of said pressurized vessel;
    a core element movably disposed in said upper and lower chambers, said core element moving in said upper and lower chambers under the effect of a vessel pressure and an upper chamber pressure;
    a means to trap said vessel pressure in said upper chamber, said means to trap being sealably disposed in said housing and in operative association with said core element so that said upper chamber pressure is isolated from said vessel pressure; and
    a detector shield disposed on said housing proximate the opening and further covering a portion of said housing.

12. An integral pressure sensor as set forth in claim 11 further comprising a means for detecting the presence of said core element in said upper chamber, said means for detecting externally disposed on said pressurized vessel proximate said upper chamber.

13. An integral pressure sensor as set forth in claim 11 further comprising a reset spring disposed in said lower chamber.

14. An integral pressure sensor as set forth in claim 11 wherein the means to trap said vessel pressure in said upper chamber further comprises:
    a sealing device disposed in said housing and further disposed between said upper and lower chambers; and
    an elastic force member attached within said housing and further in contact with said core element, said elastic force member biased such that the core element comes in contact with said sealing device to sealably isolate the chamber pressure from said vessel pressure.

15. A method for detecting leaks in a pressurized vessel, comprising the steps of:
    attaching an integral pressure sensing device to an interior surface of said vessel, said integral pressure sensing device comprising a housing which defines an interior chamber and an opening; a core element disposed in said interior chamber; a sealing device disposed in said housing and proximate said opening; and an elastic force member attached within said housing and further in contact with said core element, said elastic force member biased such that the core element comes in contact with said sealing device to sealably isolate the chamber from said vessel;
    pressurizing said vessel with a pressurized medium;
    trapping a specified volume of said pressurized medium in said interior chamber so that said core element together with said elastic force member and said sealing device form an impermeable seal between said interior chamber and said vessel when said interior chamber pressure is equal to said vessel pressure, and further so that said core element is ejected from said interior chamber when said interior chamber pressure exceeds said vessel pressure due to a leak in said pressurized vessel; and
    placing a detector on an exterior surface of said pressurized vessel proximate said housing so that the presence or absence of said core element can be ascertained.

* * * * *